(12) United States Patent
Mizutani et al.

(10) Patent No.: US 6,672,027 B2
(45) Date of Patent: Jan. 6, 2004

(54) PILLAR TRIM MOUNTING STRUCTURE

(75) Inventors: Yasumi Mizutani, Kanagawa-ken (JP); Minoru Shimazu, Kanagawa-ken (JP)

(73) Assignees: Nissan Motor Co., Ltd., Kanagawa (JP); Kasai Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 09/842,247

(22) Filed: Apr. 26, 2001

(65) Prior Publication Data
US 2001/0052210 A1 Dec. 20, 2001

(30) Foreign Application Priority Data
Apr. 28, 2000 (JP) ........................................ 2000-131142

(51) Int. Cl.$^7$ ................................................. E04C 2/38
(52) U.S. Cl. ................ 52/716.14; 52/716.1; 280/728.1; 280/730.2
(58) Field of Search ............................... 296/35.2, 37.7, 296/37.8, 83, 216.09, 140; 280/728.1, 728.2, 730.1, 730.2, 743.1; 52/716.01, 716.14, 735.1, 736.3, 736.4, 737.1

(56) References Cited
U.S. PATENT DOCUMENTS

| | | | |
|---|---|---|---|
| 5,921,575 A | * 7/1999 | Kretschmer et al. | ..... 280/728.2 |
| 6,176,515 B1 | * 1/2001 | Wallner et al. | .......... 280/730.2 |
| 6,234,515 B1 | * 5/2001 | Iwanaga | .................. 280/728.2 |
| 6,254,123 B1 | * 7/2001 | Urushi et al. | ............. 280/730.2 |
| 6,305,707 B1 | * 10/2001 | Ishiyama et al. | ........ 280/728.2 |
| 6,336,651 B1 | * 1/2002 | Mramor et al. | ............. 20/728.2 |
| 6,371,512 B1 | * 4/2002 | Asano et al. | ............. 280/730.2 |
| 6,375,214 B1 | * 4/2002 | Nishikaji | .................. 280/728.2 |

* cited by examiner

Primary Examiner—Carl D. Friedman
Assistant Examiner—Yvonne M. Horton
(74) Attorney, Agent, or Firm—Dickstein Shapiro Morin & Oshinsky LLP

(57) ABSTRACT

In a pillar trim mounting structure, a clip mount is protruded from the center of the back of an upper end of a center pillar trim; locking pieces are provided on both sides thereof; a clip mounted on the clip mount and the locking pieces are fitted in a mounting hole and locking holes of a center pillar panel, respectively, so that the strength of mounting the pillar trim is increased and the center pillar trim become disengaged even when an air bag is activated. Since the conventional bolt is eliminated, the ornamental cap is also eliminated and a simple appearance can be achieved. When the air bag is activated, an upper surface of each of the locking pieces work as a barrier or a guide and prevents the air bag from entering the center pillar trim and the air bag can be guided in a proper direction of expansion.

9 Claims, 5 Drawing Sheets

PILLAR TRIM MOUNTING STRUCTURE

BACKGROUND OF THE INVENTION

1. Field of the Invention

The present invention relates to a pillar trim mounting structure to be mounted below an air bag installed on the rim of a roof, and more particularly, concerns a pillar trim mounting structure in which a conventional ornamental cap is eliminated, a simple appearance can be achieved, good mounting can easily be achieved, and the movement of the air bag can be smoothly controlled in a direction of expansion.

2. Description of the Related Art

For example, a structure in which the air bag is built in a steering wheel, an instrument panel, or the like is adopted in order to ensure passenger safety. Recently, curtain-type air bags have been installed along the side of the roof of vehicles in a front-rear direction thereof in order to protect passengers in the case of impact to a side of a vehicle.

As shown in FIG. 7, an air bag 2 (shown by a diagonally shaded area) is accommodated the inside of a rim 1a of a roof trim 1, and is mounted on a roof panel (not shown).

The pillar trim can easily be mounted in a single motion using a clip in a structure having no air bag 2; however, in a structure in which the pillar trim mounting structure is mounted below the air bag 2, the clip may be disengaged from the pillar trim as a result of the clip being unable to withstand the expansion force of the air bag 2. Accordingly, as shown in FIG. 8 and FIG. 9, an embossed mounting section 3a is formed on a pillar trim 3 at the back thereof, a bolt 4 is fastened in a mounting hole 5a of a pillar panel 5 through a mounting hole 3b, thereby providing firm mounting.

An ornamental cap 6 is fitted in an opening 3c of the mounting section 3a of the pillar trim 3 to cover the head of the bolt 4 to improve the appearance, and an upper end 3d of the pillar trim 3 is brought into contact with and sealed with the surface of a roof trim 1 which covers the air bag 2 mounted on a roof panel 7, at the juncture of the roof trim 1 and the pillar trim 3.

In addition, a separating bracket 8 is provided at the upper end of the pillar panel 5 so that the direction in which the air bag 2 expands can be controlled.

As described above, since in the conventional case, the pillar trim 3, which is mounted below the air bag 2 disposed on the roof section, has a fastening structure which includes the bolt 4 in order to provide sufficient strength to withstand the expansion force of the air bag 2, the mounting thereof is cumbersome, and it should be noted that the ornamental cap 6 which covers the head of the bolt 4 results in an unpleasant appearance, thereby decreasing the quality of the product design.

Furthermore, it is necessary that the separating bracket 8 be assembled at a boundary between the roof panel 7 and the pillar panel 5 in order to smoothly control the movement/ expansion of the air bag 2 in the direction of expansion. This causes the number of steps to increase, thereby decreasing productivity.

SUMMARY OF THE INVENTION

The present invention is made in consideration of the above problems. Accordingly, it is an object of the present invention to provide a pillar trim mounting structure in which a curtain-type air bag is installed along the side of a roof panel in a front-rear direction of a vehicle and which is to be mounted below the air bag, wherein a bolt fastening structure is eliminated, thereby improving mountability, giving the design a simple appearance, and enabling the air bag to be smoothly controlled in the direction of expansion when activated.

In order to achieve the above object, according to the present invention, there is provided a pillar trim mounting structure in which a curtain-type air bag is disposed along the side of a roof panel which faces the interior of the vehicle and which is to be mounted below the air bag, wherein the pillar trim is mounted on a pillar panel by a clip mounted on a clip mount extending from the back of the pillar trim, wherein locking pieces extending horizontally are provided on one of the pillar trim and the pillar panel, wherein locking holes each engaging the locking pieces are formed on the other one of the pillar trim and the pillar panel, and wherein each of the locking pieces has an engaging-force reinforcing device for increasing the engaging force between the locking piece and the locking hole in accordance with the pressure exerted by the air bag when the air bag expands.

Furthermore, according to the present invention, the engaging-force reinforcing device provided for the locking piece is a pawl section engaging the rim of the locking hole, which is formed at the end of the locking piece in such a manner as to be bent downward.

In this instance, preferably, the locking pieces are provided on both sides of the clip mount. When at least one reinforcing rib extending in the mounting direction is formed at the back of the locking piece, it produces a reinforcing effect against a reactive force when the air bag expands and prevents deformation of the locking piece, thus increasing the strength of mounting the pillar trim.

Furthermore, when a downward-sloping guide face is formed at the top end of the upper surface of the locking piece, the locking piece can easily be inserted in the locking hole of the pillar panel.

As is apparent from the above construction, in the pillar trim mounting structure according to the present invention, the clip mount is formed on the back of the pillar trim; the locking pieces extending horizontally are provided in the vicinity of the clip mount on one of the pillar trim and the pillar panel; and the locking holes each engaging the locking pieces are formed on the other one, wherein the clip mounted on the clip mount is press fitted in the mounting hole of the pillar panel, and wherein the pawl section of the locking piece positioned near the clip is inserted in the locking hole of the pillar panel. Thus, when the air bag is activated, the pawl section of the locking piece and the rim of the locking hole of the pillar panel are engaged to each other in accordance with the pressure exerted by the air bag, thus ensuring that the strength of mounting the pillar trim has sufficient strength to withstand the expansion force of the air bag.

Furthermore, since the conventional bolt is eliminated, there is no need for the ornamental cap; thus, a simple appearance of the pillar trim can be achieved.

In addition, since the locking pieces are provided on both sides of the clip mount, the locking pieces work as a partition which can guide the air bag to expand toward the interior when the air bag is activated. Accordingly, the expansion of the air bag can be smoothly controlled, and the separating bracket, which is conventionally assembled on the panel, can be eliminated.

In addition, since the locking pieces are arranged on both sides of the clip mount, the air bag can expand more smoothly, and the locking pieces and the locking holes can be more securely engaged to each other.

DESCRIPTION OF THE PREFERRED EMBODIMENTS

Embodiments in which a pillar trim mounting structure according to the present invention is applied to a center pillar trim mounting structure will be specifically described hereinbelow with reference to the accompanying drawings.

Figure 1:
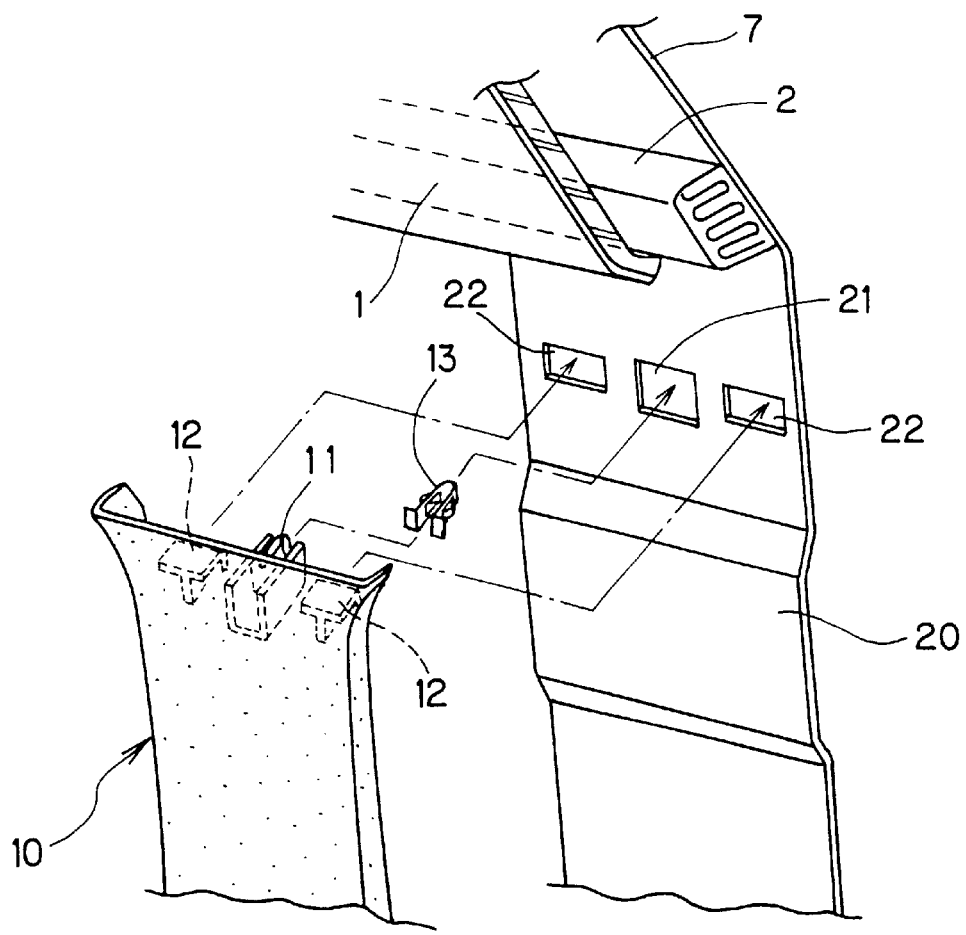
FIG. 1 is a perspective view showing a first embodiment in which a pillar trim mounting structure according to the present invention is applied to a center pillar trim mounting structure.
Figure 2:
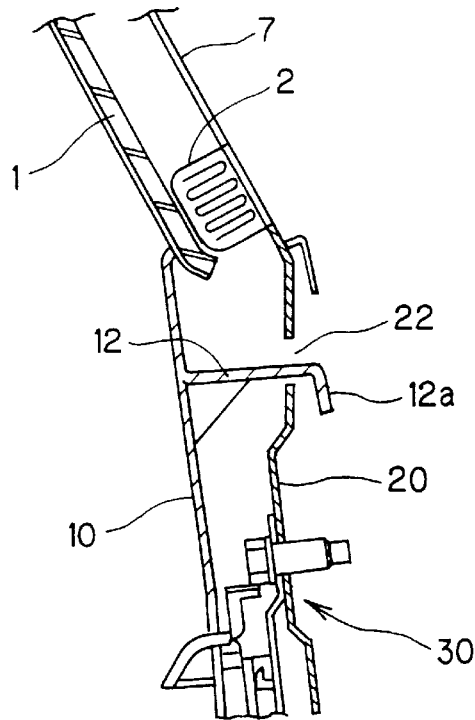
FIG. 2 is a cross sectional view showing a state in which the center pillar trim shown in FIG. 1 is mounted on a panel.
Figure 3:
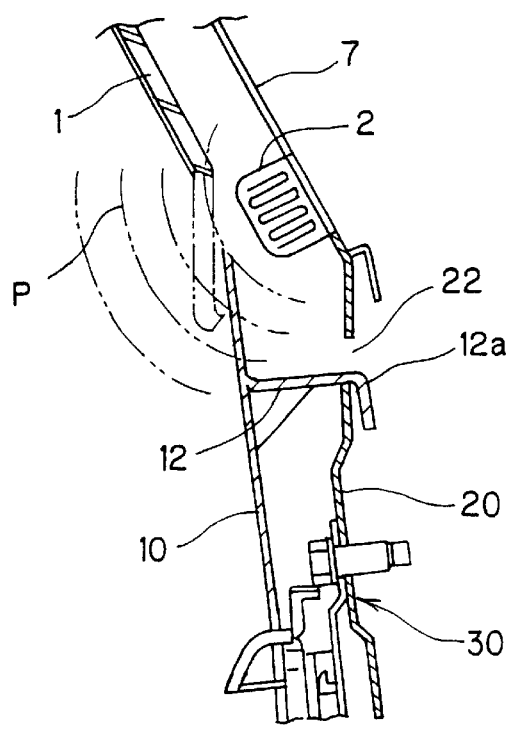
FIG. 3 is an explanatory view showing a state in which an air bag in the center pillar trim shown in FIG. 1 is activated.
Figure 4:
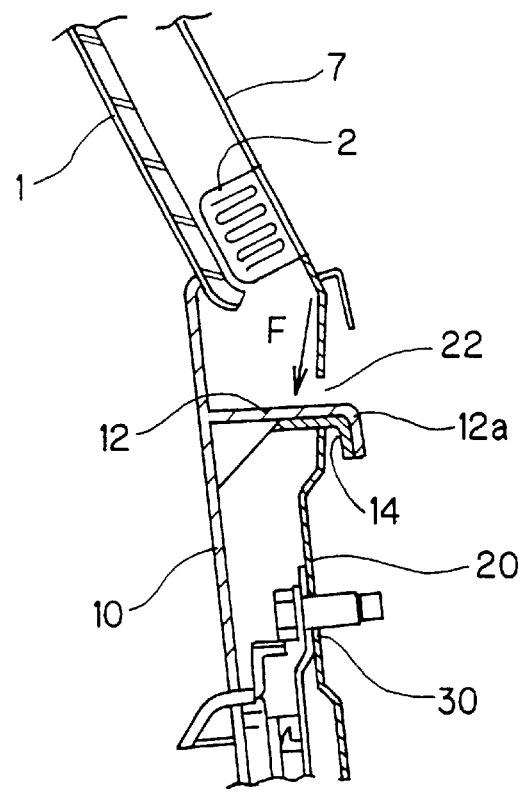
FIG. 4 is a cross sectional view showing a second embodiment in which the pillar trim mounting structure according to the present invention is applied to a center pillar trim mounting structure.
Figure 5:
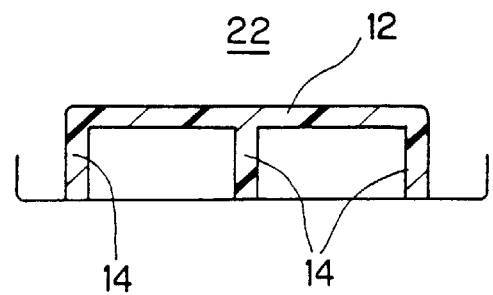
FIG. 5 is a cross sectional view of a locking piece in the center pillar trim mounting structure shown in FIG. 4.
Figure 6:
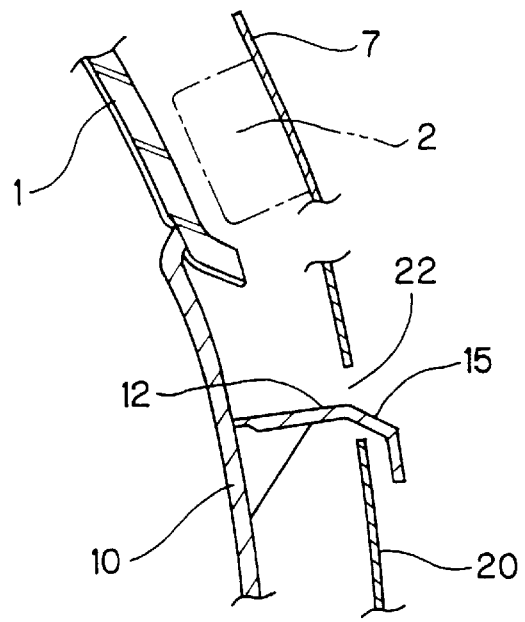
FIG. 6 is a cross sectional view showing a third embodiment in which the pillar trim mounting structure according to the present invention is applied to a center pillar trim mounting structure.

FIG. 1 is a perspective view showing a first embodiment of a center pillar trim mounting structure; FIG. 2 is a cross sectional view showing the center pillar trim mounting structure; FIG. 3 is an explanatory view showing an operation of the center pillar trim mounting structure; FIG. 4 and FIG. 5 are cross sectional views showing a second embodiment of the center pillar trim mounting structure; and FIG. 6 is a cross sectional view showing a third embodiment of the center pillar trim mounting structure.

Figure 7:
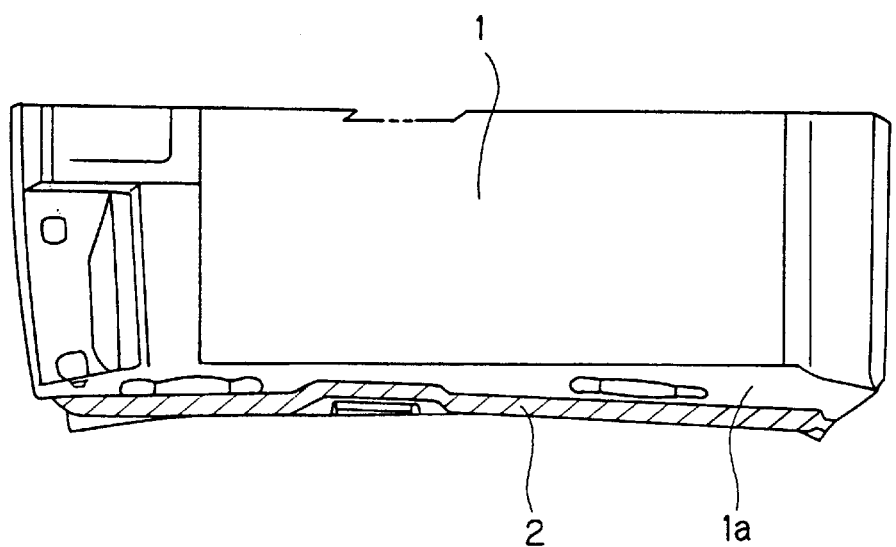
FIG. 7 is a plan view of a roof trim, showing a layout of a curtain-type air bag.
Figure 8:
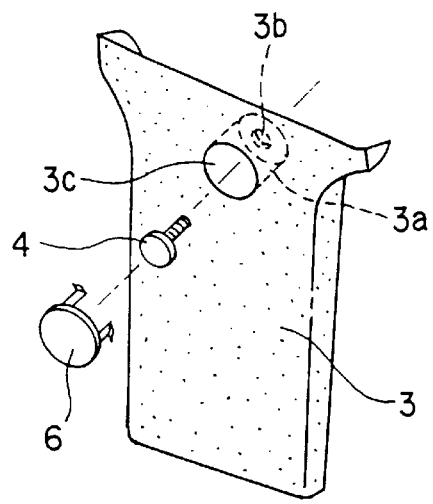
FIG. 8 is a perspective view showing a conventional pillar trim.
Figure 9:
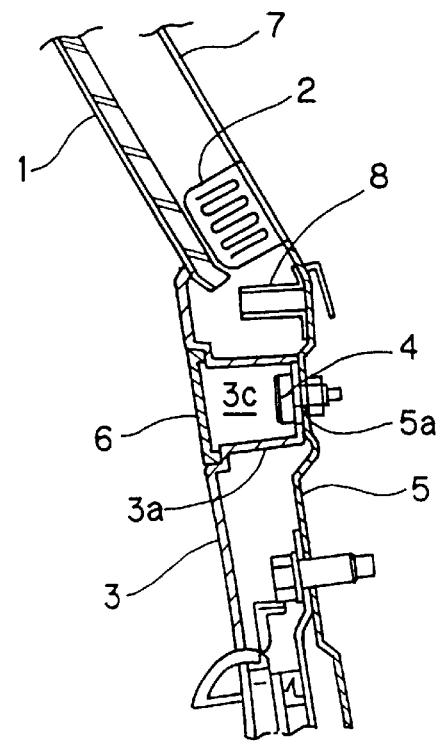
FIG. 9 is a cross sectional view showing a conventional pillar trim mounting structure.

In addition, the object to which the center pillar trim is mounted is a center pillar panel located below a curtain-type air bag 2 shown in FIG. 7, which is described in the related art.

Referring to FIG. 1 and FIG. 2, the center pillar trim mounting structure will be described. A center pillar trim 10 is formed of an injection-molded polypropylene (PP) resin, wherein a clip mount 11 is formed at the center of the back at the upper end of the center pillar trim 10 in a protruding manner, and wherein locking pieces 12 extending laterally and horizontally are provided at bilaterally symmetric positions on both sides of the clip mount 11. Accordingly, when the air bag 2 expands, the force applied from the air bag 2 to the right and left sides of the center pillar trim 10 is equalized, so that deformation of the center pillar trim 10 is effectively prevented. Thus, expansion of the air bag 2 can be more smoothly controlled.

The center pillar trim 10 is secured to a center pillar panel 20 via a clip 13 mounted to the clip mount 11 and the locking pieces 12 provided on both sides of the clip mount 11. For this purpose, the center pillar panel 20 is provided with a rectangular mounting hole 21 into which the clip 13 is press fitted, and locking holes 22 on the right and left sides of the mounting hole 21 in which the locking pieces 12 are locked.

In addition, the air bag 2 mounted on a roof panel 7 is positioned above the center pillar panel 20, and a roof trim 1 covers the air bag 2 on the interior.

Accordingly, in a state in which the center pillar trim 10 is mounted on the center pillar panel 20 below the air bag 2, the clip 13 is fitted in the mounting hole 21 of the center pillar panel 20, which is not shown in FIG. 2, and pawl sections 12a of the locking pieces 12 positioned on both sides thereof are each inserted in the locking holes 22 of the center pillar panel 20. Reference numeral 30 in FIG. 3 denotes an anchor section for a seat belt.

Therefore, when the pillar trim mounting structure according to the present invention is applied to the center pillar trim 10, the clip mount 11 and the locking pieces 12 are formed on the back at the upper end of the center pillar trim 10, as shown in FIG. 1, so that mounting of the center pillar trim 10 is completed merely by inserting the clip 13 mounted to the clip mount 11 and the locking pieces 12 into the mounting hole 21 and the locking holes 22 of the center pillar panel 20, respectively. Consequently, cumbersome works such as bolting in the conventional art can be omitted, the mountability of the center pillar trim 10 can be improved, and also, the ornamental cap for covering the bolt head in the related art can be eliminated, so that a simple appearance can be achieved, and thus, the center pillar trim 10 of a good product design can be provided.

Furthermore, in the mounting structure of the center pillar trim 10 according to the present invention, as shown in FIG. 3, when the air bag 2 expands, the air bag 2 expands concentrically with the mounting section thereof as the center, as shown by symbol P. In this instance, even when an external force is applied in the direction in which the center pillar trim 10 is disengaged by an expansion force of the air bag 2, the pawl sections 12a at the ends of the locking pieces 12 are each locked to the rims of the locking holes 22. Accordingly, the center pillar trim 10 is securely fixed to the center pillar panel 20, and is not disengaged therefrom; thus, sufficient strength of mounting the center pillar trim 10 can be provided.

Also, when the air bag 2 expands, since the air bag 2 is guided along the upper surfaces of the locking pieces 12 extending horizontally, the air bag 2 does not enter the interior of the center pillar trim 10. This is advantageous in that the direction in which the air bag 2 expands can be smoothly controlled in spite of the fact that the conventional separating bracket 8 is not used.

Next, FIG. 4 and FIG. 5 show a second embodiment in which the pillar trim mounting structure according to the present invention is applied to the center pillar trim 10. Elements identical to those in the first embodiment are given the same reference numerals and a detailed description thereof is omitted.

In the second embodiment, each of the locking pieces 12 formed on both sides of the clip mount 11 on the back of the center pillar trim 10 has reinforcing ribs 14 extending in the direction of mounting at three positions on both sides on the back of the locking piece 12 and at the center thereof.

Thus, according to the second embodiment, upper parts of the locking pieces 12 are pressed downward by an expansion force (shown by symbol F in FIG. 4) of the air bag 2, and at this time, the locking pieces 12 are each securely fixed in the locking holes 22 of the center pillar panel 20 by the reinforcing ribs 14, thereby improving the ability to prevent the center pillar trim 10 from disengaging.

Next, FIG. 6 shows a third embodiment of the pillar trim mounting structure according to the present invention. Also in the third embodiment, elements identical to the foregoing embodiments are denoted by the same reference numerals and a detailed description thereof is omitted.

In the third embodiment, each of the locking pieces 12 has a guide face 15 which slopes. The guide face 15 is formed on the top end of the upper surface of the locking piece 12 in such a manner that the guide face 15 inclines downward at a position where the center pillar trim 10 comes into contact with the center pillar panel 20 when the center pillar trim 10 is mounted on the center pillar panel 20.

Accordingly, even if the mounted position of the center pillar trim 10 deviates in the vertical direction when mounted, the guide face 15 of the locking piece 12 abuts to the upper rim of the locking hole 22 of the center pillar panel 20, and the locking piece 12 is guided along the guide face 15 and can be inserted in the locking hole 22 of the center pillar panel 20, and thus the mountability of the center pillar trim 10 can be improved.

While the foregoing relates only to preferred embodiments in which the present invention is applied to the mounting structure of the center pillar trim 10 to be mounted on the center pillar panel 20, it is not limited thereto. In the arrangement in which the air bag 2 is disposed along the side of the roof panel in a front-rear direction of the vehicle, the present invention may be applied to mounting structures of a front pillar trim and a rear pillar trim.

Also, in the embodiments, although the locking pieces 12 are arranged at bilateral symmetrical positions on both sides of the clip mount 11 in order to allow smooth expansion of the air bag 2 and to fix the locking pieces 12 of the center pillar trim 10 in the locking holes 22 of the center pillar panel 20 more firmly, the invention is not limited thereto and the mounting position and the number of the clip mounts 11 and the locking pieces 12 may be decided upon as appropriate. Furthermore, a structure in which the locking pieces 12 are disposed on the center pillar panel 20 and the locking holes 22 are disposed on the center pillar trim 10 may also be adopted.

As described above, in the pillar trim mounting structure according to the present invention, conventional bolting is eliminated; instead, the clip is mounted on the clip mount and is press fitted in the pillar panel; the locking pieces are provided in the vicinity of the clip mount on one of the pillar trim and the pillar panel; and the locking holes which engage the locking pieces are opened on another thereof, so that, when the air bag expands, the locking pieces are fixed in the locking holes. Thus, the ornamental cap which is conventionally required can be eliminated, a simple appearance can be achieved, and the pillar trim can be mounted in a single motion, thereby improving mountability.

Furthermore, when the air bag is activated, the locking pieces are securely engaged to the rims of the locking holes to prevent the pillar trim from becoming disengaged, and work as a barrier to prevent the air bag from entering the pillar trim, so that the air bag is guided along the upper surface of the locking pieces toward the interior, and the direction in which the air bag expands can be smoothly controlled by the locking pieces. Consequently, there is no need to attach the separating bracket to the panel, the pillar trim can be securely mounted, and also the air bag can be controlled to smoothly expand.

In the pillar trim mounting structure according to the present invention, since the reinforcing ribs are provided at the back of each of the locking pieces, the strength to sufficiently withstand the expansion force of the air bag can be ensured and deformation of the locking pieces can be prevented, and the strength of mounting the pillar trim can be increased.

Furthermore, in the pillar trim mounting structure according to the present invention, since the downward-sloping guide face is formed at the end of the upper surface of each of the locking pieces, the locking pieces can easily be inserted in the locking holes of the pillar panel, thereby improving the workability.

What is claimed is:

1. A pillar trim mounting structure of a vehicle in which a curtain-type air bag is disposed along the inside of a roof panel and a pillar trim is mounted below the air bag, comprising:

a pillar panel;

a pillar trim; the pillar trim being mounted on the pillar panel;

a clip mount; the clip mount being protruded from the back of the pillar trim;

a clip; the clip being mounted on the clip mount;

a plurality of locking pieces; the locking pieces being formed on the back of pillar trim and extending horizontally; and a plurality of locking holes, the locking holes being provided on the pillar panel and engaged with the locking pieces;

wherein each of the locking pieces has engaging-force reinforcing means for increasing an engaging force between the locking piece and the locking hole in accordance with the pressure from the air bag.

2. A pillar trim mounting structure according to claim 1, wherein the engaging-force reinforcing means provided for the locking pieces is a pawl section, the pawl section being formed to be bent downward at the top end of the locking piece and engaged with the rim of the locking hole.

3. A pillar trim mounting structure according to claim 1 or claim 2, wherein at least one reinforcing rib is provided in a mounting direction at the back of the locking piece, the reinforce rib reinforcing the locking piece against a reactive force of an air bag when the air bag expands.

4. A pillar trim mounting structure according to claim 1, wherein a downward sloping guide face is formed at a top end of an upper surface of said locking piece.

5. A pillar trim mounting structure according to claim 2, wherein a downward-sloping guide face is formed at a top end of an upper surface of the locking piece.

6. A pillar trim mounting structure according to claim 3, wherein a downnward sloping guide face is formed at a top end of the upper surface of a locking piece.

7. A pillar trim mounting structure according to claim 1, wherein locking pieces extending laterally and horizontally are provided at bilaterally symmetric positions on both sides of the clip mount.

8. A pillar trim mounting structure according to claim 1, wherein said clip and said plurality of locking pieces are substantially rectilinear.

9. A vehicle interior structure comprising:

a curtain airbag disposed along the inside of a roof panel;

a pillar panel;

a pillar trim mounted on said pillar panel, said pillar trim having a first and second surface, said first surface facing away from said pillar panel and said second surface facing towards said pillar panel;

a pillar trim comprising a first and second surface, said first surface being oriented away from said pillar panel and said second surface being oriented towards said pillar panel;

a plurality of locking pieces provided on the second surface of said pillar trim and extending perpendicular from said pillar trim;

a clip insertion hole formed through the pillar panel surface;

a clip mount disposed between two said locking pieces, formed parallel to said locking pieces and extending from the second surface of said pillar trim;

a clip mounted on the clip mount, where said clip and clip insertion hole are formed and adapted to couple said clip mount and said pillar panel when said clip mounted to said clip mount is inserted into said clip insertion hole; and a plurality of locking holes provided on the pillar panel such that a hole is provided opposite a locking piece on said pillar trim such that the locking pieces insert into said holes when said pillar trim is mounted on said pillar panel;

wherein each of the locking pieces and clip mount are formed such that said locking pieces remain engaged within corresponding locking holes and said clip mount remains engaged within a clip mount hole such that the pillar trim junction edge and said pillar trim remain fixed with respect to said pillar panel when said airbag deploys and said airbag exerts a force against a top edge of said pillar trim facing said airbag, said edge further comprising a first and second reinforcing panel coupled to said pillar panel and to a bottom surface of said locking pieces which faces away from said airbag.

* * * * *